United States Patent [19]

Doyle

[11] Patent Number: 4,928,048

[45] Date of Patent: May 22, 1990

[54] FAST RESPONSE CONTROL CIRCUIT

[75] Inventor: James H. Doyle, Orange, Calif.

[73] Assignee: Unit Instruments, Inc., Orange, Calif.

[21] Appl. No.: 174,515

[22] Filed: Mar. 28, 1988

[51] Int. Cl.$^5$ ............................................... G05B 7/00
[52] U.S. Cl. ..................................... 318/644; 318/628; 73/196
[58] Field of Search ........ 318/644, 628, 685, 560–561, 318/565; 73/195–196, 203; 210/101; 417/70, 43; 251/25–29, 30.01

[56] References Cited

U.S. PATENT DOCUMENTS 4,244,517  1/1981  Stanke et al. ...................... 318/644
4,733,152  3/1988  Allington ............................ 318/685

Primary Examiner—William M. Shoop, Jr.
Assistant Examiner—David Martin
Attorney, Agent, or Firm—Fulwider, Patton, Lee & Utecht

[57] ABSTRACT

A fast response control circuit for providing an output signal in miminum time after receiving an enabling input signal. The control circuit includes an amplifier which provides an output signal having a magnitude determined by a variable input signal when the enabling input signal indicates that an output signal is desired. A feedback network and the amplifier together define a control loop which has a characteristic response time. When the enable signal is absent, a bias control biases a reactive component in the control loop so as to minimize this response time. The circuit is adapted for use in a fluid mass flow controller to provide rapid response to an enabling input signal, particularly when a very low fluid flow rate is desired.

18 Claims, 5 Drawing Sheets

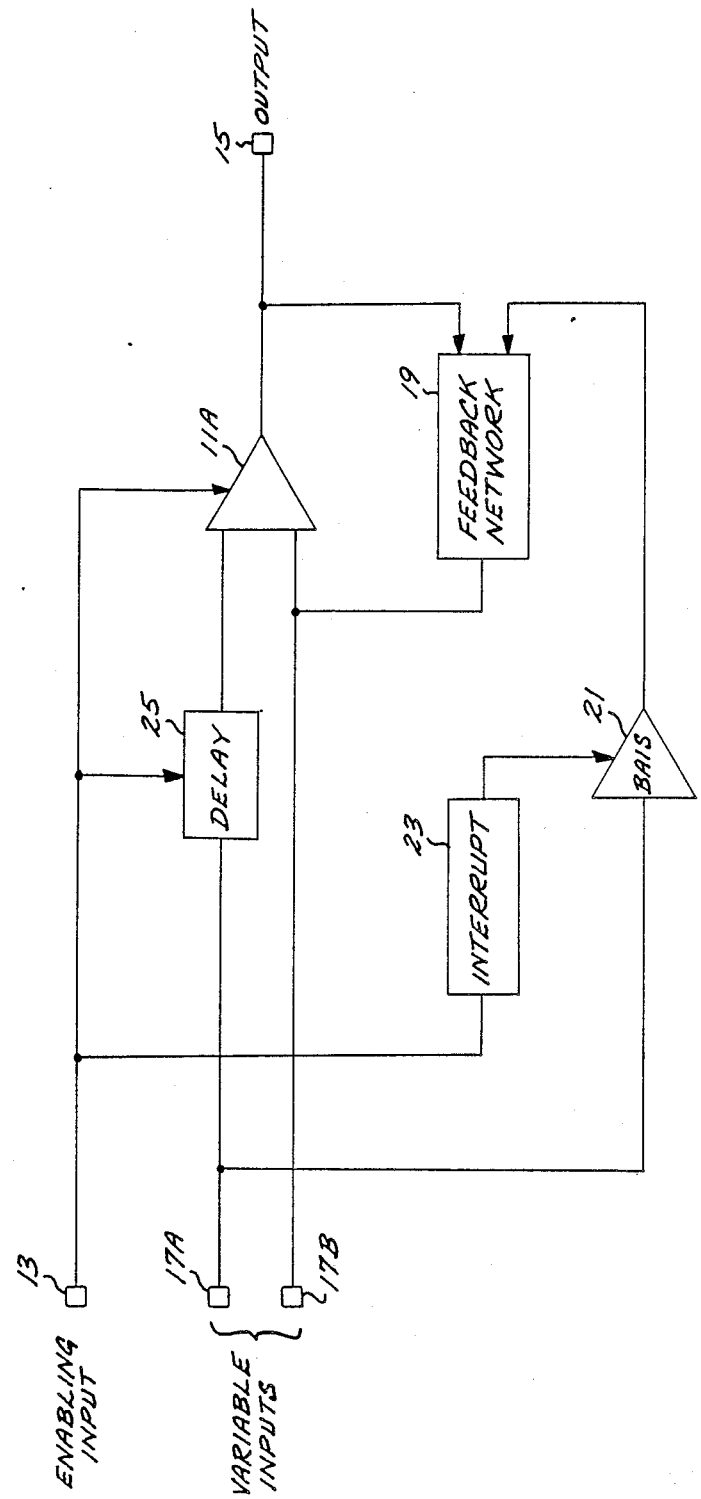
FIG. IC

FAST RESPONSE CONTROL CIRCUIT

BACKGROUND OF THE INVENTION

The present invention relates generally to electronic controls and more particularly to fast-response feedback-stabilized control circuits.

A control circuit such as a direct current amplifier receives an input signal and amplifies it to provide an output signal which is used, for example, to regulate a physical process by means of an electromechanical transducer. Such an amplifier may take the form of a differential amplifier which provides an output signal having a magnitude determined by any difference between a first input signal indicative of a desired state of the process and a second input signal indicative of the actual state of the process. In response to the output signal, the transducer regulates the process so as to cause the actual state of the process to approach the desired state.

It is sometimes required that the physical process commence precisely at a certain moment, for example to enable the duration of the process to be accurately controlled or to synchronize the commencement of the process with an external event. Under such circumstances an enabling input signal, which may be generated either manually or by automatic means such as a computer, is used to start and stop the process. When it is desired that the process commence, this enabling input signal is applied to the amplifier and causes the amplifier to provide the output signal.

An example of a physical process which is controlled in the above-described manner is the rate of mass flow of a fluid. A fluid mass flow controller has a sensor which measures the rate of mass flow of a fluid and provides a "mass flow" signal indicative of the measured rate of mass flow. An externally-generated "set point" signal indicates a desired rate of mass flow. When an enabling input signal indicates that the fluid should start flowing, a differential amplifier provides an output signal indicative of any difference between the mass flow and set point signals. An electromechanical transducer—specifically, a solenoid valve—opens in response to the valve signal to permit the fluid to begin flowing. The valve opens more or less according to the magnitude of the valve signal to increase or decrease the rate of mass flow of the fluid so as to minimize any difference between the mass flow and set point signals and thereby cause the actual rate of mass flow to approach the desired rate.

A feedback network having reactive components such as capacitors is commonly used in conjunction with a direct current amplifier, the network and the amplifier together defining a control loop, for example to prevent oscillation, to improve stability, to provide a desired input impedance, or the like. However, these reactive components are characterized by a time constant which results in a finite delay between the time the enabling input signal is provided and the time the amplifier is able to provide the output signal. For example, in a fluid mass flow controller of the kind described above, the amplifier includes an associated feedback network. This circuit is characterized by a delay, or response, time which must elapse between the time the enabling input signal arrives and the time the amplifier is able to provide the valve signal which causes the valve to open and initiate the flow.

Although the response time which is characteristic of an amplifier having reactive control loop components may be of little significance if the actual time at which the process commences is not critical, it is of great importance in those applications in which the moment at which the process commences must be accurately controlled. This is especially true when only a relatively small change in the magnitude of the process is desired because it often takes longer for the control loop to respond to a small input signal than to a large one. Accordingly, there is a need for a way to minimize this response time in electronic control circuits.

SUMMARY OF THE INVENTION

The present invention provides a fast response control circuit characterized by bias means which applies a bias signal to a control loop having reactive components and thereby minimizes the response time of the circuit. With essentially no delay, a control circuit according to the invention provides an output signal in response to an enabling input signal so as to permit precise regulation and control of the commencement time of a physical process.

A fast response control circuit according to the invention includes amplifier means, responsive to an enabling input signal to provide an output signal having a magnitude determined by a variable input signal; a feedback network in feedback relationship with the amplifier means and and defining therewith a control loop characterized by a response time; and bias means, in electrical communication with the control loop, operative to apply a bias signal to the control loop to reduce the response time. In one embodiment the amplifier means comprises a differential amplifier, the magnitude of the output signal being determined by any difference between first and second variable input signals.

The control loop typically includes a reactive component such as a capacitor, and the bias signal is applied to change the level of charge on the capacitor. The bias signal "pre-changes" the capacitor as closely as possible to an expected steady state charge level which the capacitor is expected to reach as the output signal reaches its steady state value. Thus, when the enabling input signal arrives the response time of the control loop is much shorter than it would have been had the capacitor not been pre-charged, and accordingly the output signal is able to reach its final value more rapidly.

In some applications the expected steady state charge level of the capacitor is dependent on the value of the variable input signal. Accordingly, in such embodiments the magnitude of the bias signal is determined by the input signal (or by one of the two variable input signals if a differential amplifier is being used) so as to pre-charge the capacitor as closely as possible to its expected steady state charge level. In other applications the expected steady state charge level is nearly independent of the variable input signal, and in such embodiments the magnitude of the bias signal is determined independently of the input signal.

Interrupt means preferably interrupts the communication between the bias means and the control loop when the enabling input signal is received so as to prevent the bias signal from interfering with normal circuit operation during the time the circuit is enabled.

One embodiment includes delay means to delay application of the variable input signal to the amplifier means for a short time after arrival of the enabling input signal, for example to improve stability.

In a preferred embodiment the invention is advantageously applied to minimize the response time of a fluid mass flow controller of the kind having means to provide a mass flow signal indicative of a measured rate of mass flow of a fluid, means to receive a set point signal indicative of a desired rate of mass flow of the fluid, means to receive an enabling input signal to start the flow of the fluid, amplifier means responsive to the enabling input signal to provide an output signal indicative of any difference between the mass flow and set point signals, a feedback network in feedback relationship with the amplifier means and and defining therewith a control loop characterized by a response time required for the output signal to attain a magnitude indicative of said difference, and valve means responsive to the output signal to change the rate of mass flow of the fluid to minimize said difference. Bias means applies a bias signal to the control loop when the fluid is not flowing, and, when the enabling input signal commands the fluid flow to start, the valve opens virtually instantaneously.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 1C is a block diagram of a fast response control circuit which is similar to that depicted in FIG. 1A except that the amplifier is a differential amplifier having two inputs instead of one;

DESCRIPTION OF THE PREFERRED EMBODIMENT

Figure 1A:
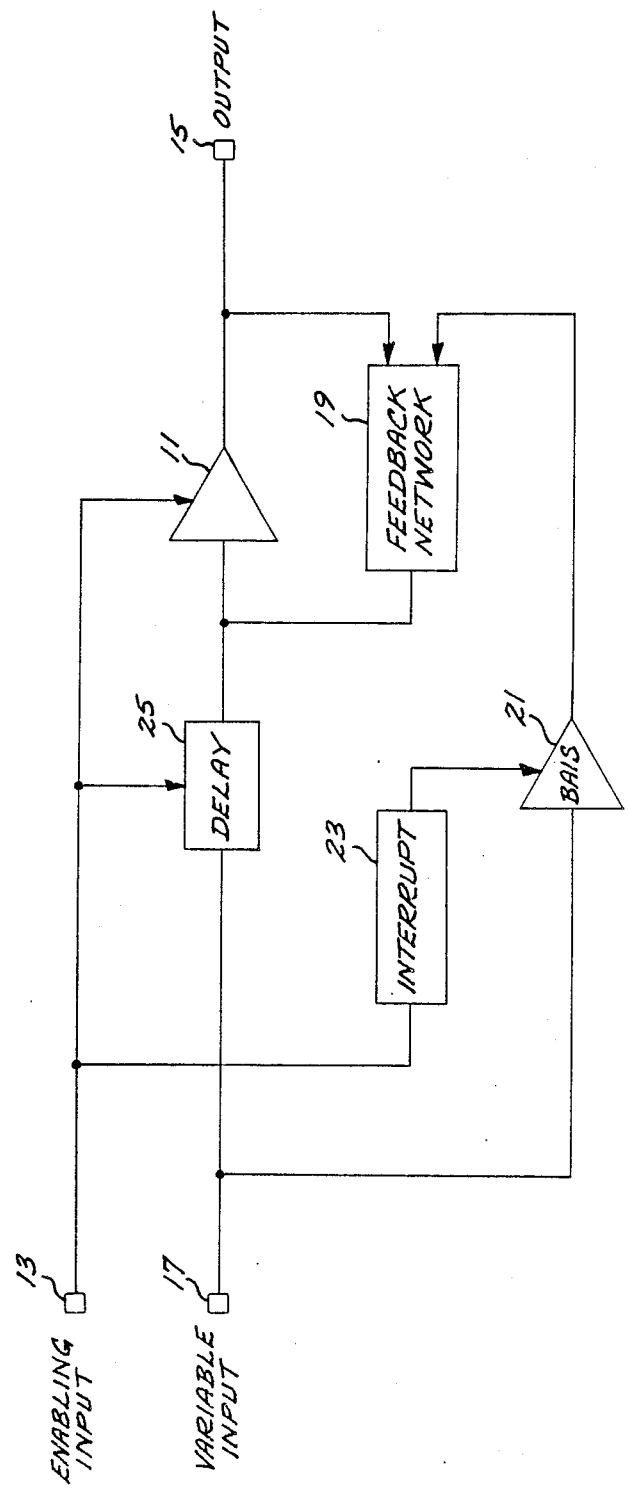
FIG. 1A is a block diagram of a fast response control circuit according to the invention.

As shown in the drawings for purposes of illustration, the invention is embodied in a novel fast response control circuit. A conventional control circuit such as a direct current amplifier having a feedback network is characterized by a finite response time to provide an output signal in response to an enabling input signal. However, such a circuit is inadequate for applications requiring that an output signal be provided immediately upon command.

In accordance with the invention, a fast response control circuit having a control loop includes means to bias the control loop. When an enabling input signal arrives, this bias on the control loop allows the circuit to respond with essentially no delay. By means of a control circuit according to the invention it is possible to achieve virtually instantaneous initiation of a physical process, for example the flow of a fluid, on command and at a precisely determined rate.

A fast response control circuit according to the invention, as shown illustratively in block diagram form in FIG. 1A, comprises a differential amplifier means 11 responsive to an enabling input signal as received at an enabling input terminal 13 to provide an output signal at an output terminal 15 having a magnitude determined by an variable input signal as received at an input terminal 17; a feedback network 19 in feedback relationship with the amplifier means 11 and defining therewith a control loop characterized by a response time; and bias means 21 in electrical communication with the control loop 19 and operative to apply a bias signal to the control loop 19 and thereby to reduce the response time.

Figure 1B:
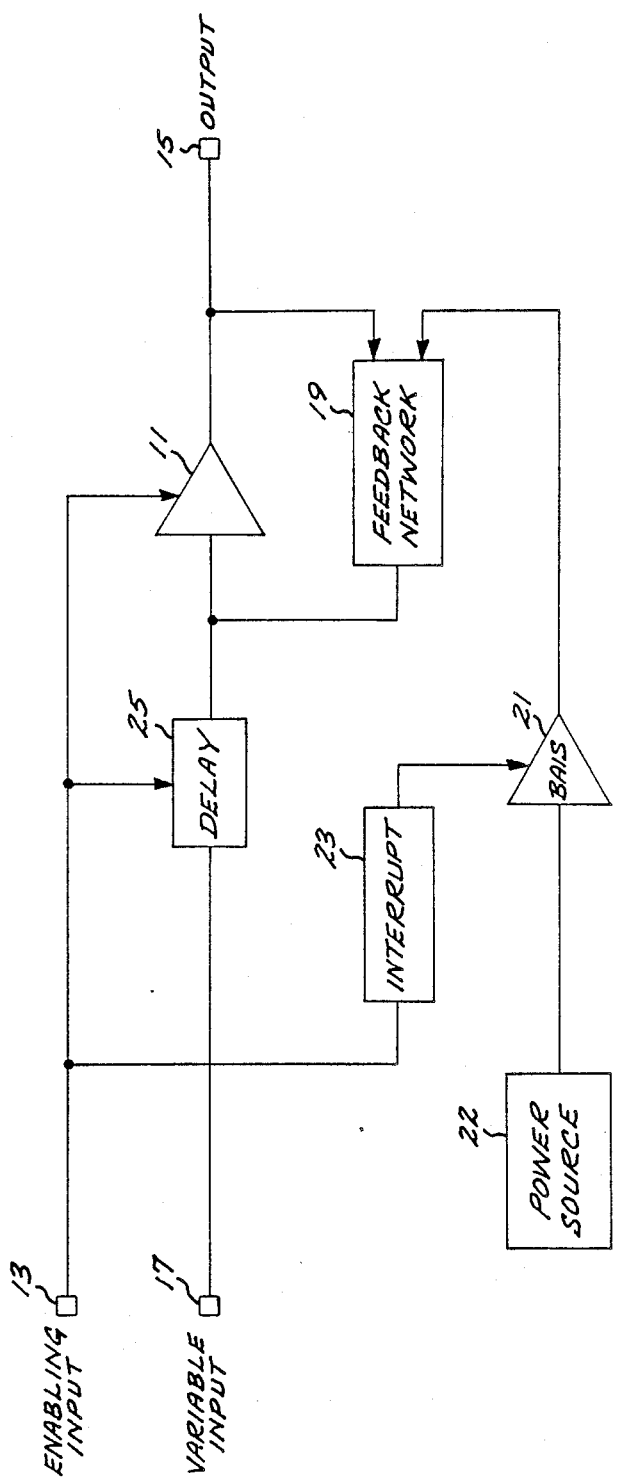
FIG. 1B is a block diagram of a fast response control circuit which is similar to that depicted in FIG. 1A except that the bias means receives an input from a power source instead of from an input terminal.

The bias means 21 receives the variable input signal from the input terminal 17 and the magnitude of the bias signal is accordingly determined by the input signal. In an alternate embodiment as shown in FIG. 1B, the bias means 21 instead receives a potential from a power source 22 or the like, and the magnitude of the bias signal is accordingly independent of the input signal.

Interrupt means 23 receives the enabling input signal from the enable terminal 13. The interrupt means 23 is responsive to the enabling input signal to interrupt the communication between the bias means 21 and the feedback network 19 when the enabling input signal is received, thereby preventing the bias signal from interfering with normal operation of the control loop during the time the circuit is enabled.

Delay means 25 receives the variable and enabling input signals from the terminals 17 and 13, respectively, and in turn provides the variable input signal to the amplifier means 11. The delay means 25 delays application of the variable input signal to the amplifier means 11, for example to improve stability. If such delay is not desired, the delay means 25 is omitted.

Figure 1D:
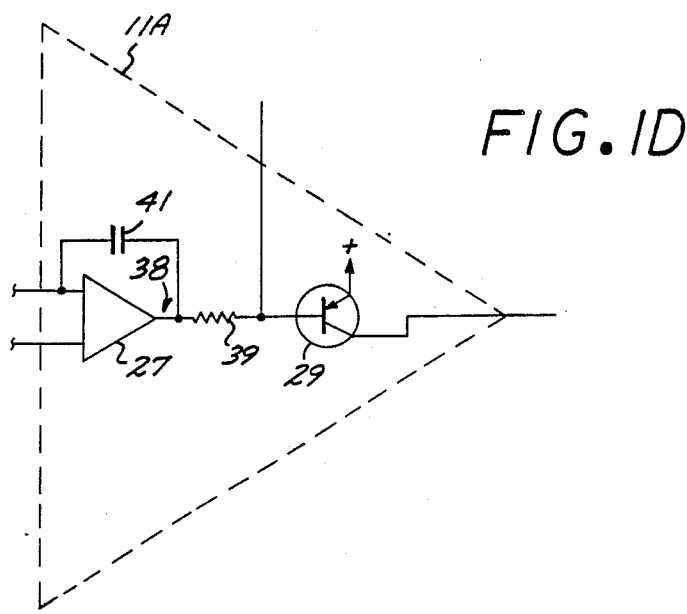
FIG. 1D is a detail of the amplifier block of FIG. 1C.
Figure 2:
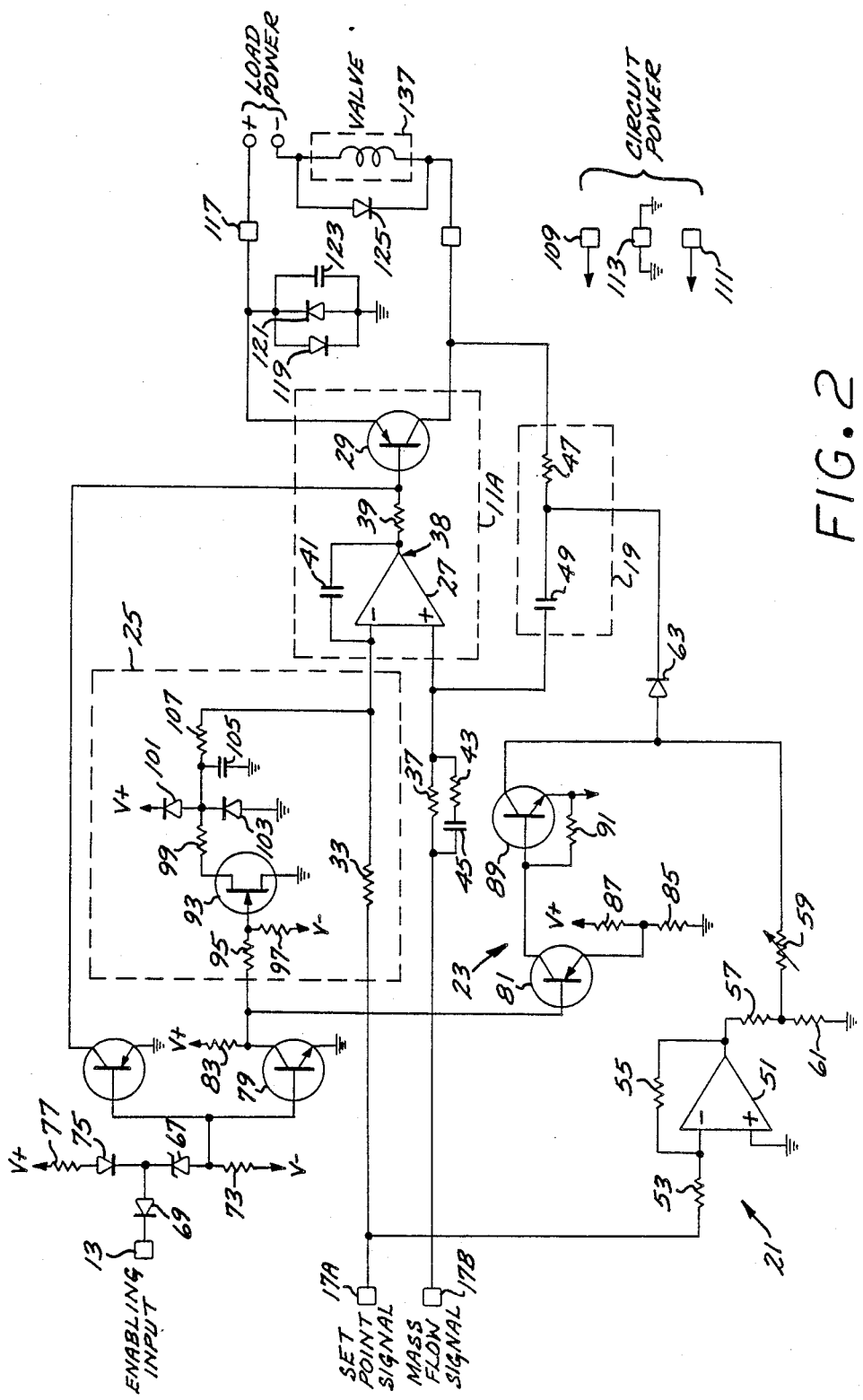
FIG. 2 is a schematic diagram of a preferred embodiment of the circuit shown in FIG. 1C.

In a preferred embodiment of the invention, differential amplifier means such as a differential amplifier 27 and a PNP output transistor 29 as shown in FIG. 1D (corresponding generally with the amplifier means 11 of the embodiment shown in FIG. 1A) provides an output signal having a magnitude determined by any difference between a first variable input signal and a second variable input signal, as shown in block diagram form in FIG. 1C and schematically in FIG. 2.

A negative input of the amplifier 27 receives the first variable input signal from a "set point" terminal 17A through a resistor 33 and a positive input of the amplifier 27 receives the second variable input signal from a "mass flow" terminal 17B through a resistor 37. (The inputs 17A and 17B correspond generally with the input terminal 17 of the embodiment shown in FIG. 1A). The amplifier 27 provides a differential signal having a magnitude determined by the difference between these two input signals. A base of the transistor 29 is connected to a terminal 38 of the amplifier 27 through a resistor 39 to receive this differential signal. The output signal is provided at a collector of the transistor 29.

A capacitor 41 is connected between the output and the negative input of the amplifier 27. A resistor 43 and a capacitor 45 in series with each other are connected in parallel with the resistor 37.

A resistor 47 is connected from the collector of the transistor 37 to a first terminal of a capacitor 49 and a second terminal of the capacitor 49 is connected to the positive input of the amplifier 27. The resistor 47 and capacitor 49 together define a feedback network (corresponding generally with the feedback network 19 of the embodiment shown in FIG. 1A in feedback relationship with the amplifier 27 and the transistor 39.

A bias amplifier 51 (corresponding generally with the bias means 21 of the embodiment shown in FIG. 1A) has a negative input which receives the first input signal from the terminal 17A through a resistor 53 and a positive input which is connected to ground. A resistor 55 is connected between the negative input and an output of the amplifier 51. The output of the amplifier 51 is connected through a resistor 57 to a first terminal of a variable resistor 59. A resistor 61 is connected between the first terminal of the variable resistor 59 and ground. A second terminal of the variable resistor 59 is connected to an anode of a diode 63, and a cathode of the diode 63 is connected to the first terminal of the capacitor 49 to apply the bias signal to change the level of charge on the capacitor 49.

A base of a PNP transistor 65 is connected to an anode of a Zener diode 67. A cathode of the diode 67 is connected to an anode of a diode 69. A cathode of the diode 69 is connected to the enabling input terminal 13 to receive the enabling input signal. An emitter of the transistor 65 is connected to ground. A collector of the transistor 65 is connected to the base of the transistor 29 to apply the enabling input signal to the transistor 29 and thereby enable the transistor 29 to provide the output signal.

The anode of the diode 67 is connected to a first terminal of a resistor 73. A second terminal of the resistor 73 is connected to a negative power supply line designated as "V−". The cathode of the diode 67 is connected to a cathode of a diode 75, and an anode of the diode 75 is connected through a resistor 77 to a positive power supply line designated as "V−".

A base of an NPN transistor 79 is connected to the base of the transistor 65. An emitter of the transistor 79 is connected to ground. A collector of the transistor 79 is connected to a base of a PNP transistor 81 and through a resistor 83 to V+.

An emitter of the transistor 81 is connected to ground through a resistor 85 and to V+ through a resistor 87. A collector of the transistor 81 is connected to a base of an NPN transistor 89 and to V− through a resistor 91. An emitter of the transistor 89 is connected to V−. A collector of the transistor 89 is connected to the anode of the diode 63. The transistors 81 and 89 and their associated components (corresponding generally with the interrupt means 23 of the embodiment shown in FIG. 1) interrupt the communication between the bias amplifier 51 and the capacitor 49 by applying a negative voltage to the anode of the diode 63 when the enabling input signal is present, thereby preventing the bias signal provided by the amplifier 51 from interfering with normal operation of the feedback network 19 defined by the capacitor 49 and the resistor 47.

The collector of the transistor 79 is also connected to a base of a field effect transistor ("FET") 93 through a resistor 95. The base of the FET 93 is connected to V− through a resistor 97. A drain of the FET 93 is connected to ground. A source of the FET 93 is connected through a resistor 99 to an anode of a diode 101, to a cathode of a diode 103, to a first terminal of a capacitor 105, and through a resistor 107 to the negative input of the amplifier 27. A cathode of the diode 101 is connected to V+. An anode of the diode 103, and a second terminal of the capacitor 105, are connected to ground. The FET 93 and its associated components (corresponding generally with the delay means 25 of the embodiment shown in FIG. 1A) serve to delay application of the set point signal to the negative input of the amplifier 27 for a brief time after arrival of the enabling input signal.

Electrical power is provided from a power supply (not shown) having a positive output connected to V+ at a terminal 109, a negative output connected to V− at a terminal 111, and a common return connected to ground at a terminal 113.

The collector of the transistor 29 is connected to the output terminal 15. The emitter of the transistor 29 is connected to a return terminal 117, to an anode of a diode 119, to a cathode of a diode 121, and to ground through a capacitor 123. A cathode of the diode 119 and an anode of the diode 121 are connected to ground.

A load, to be discussed in more detail hereafter, is connected from the terminal 15 to a negative terminal of a load power supply (not shown). A positive terminal of this power supply is connected to the terminal 117 and preferably to ground as well. The diodes 119 and 112 and the capacitor 123 serve to hold the emitter of the transistor 29 near ground potential in case of the external ground connection is inadequate. An anode of a surge prevention diode 125 is connected to the negative terminal of the load power supply and a cathode thereof is connected to the terminal 15.

The operation of the circuit will now be explained. In this discussion, the expression "turned off" with reference to a transistor means that the transistor is biased so that collector current does not flow, and the expression "turned on" means that the transistor is biased so that the flow of collector current is enabled.

First and second variable input signals and an enabling input signal are furnished to the terminals 17A, 17B and 13, respectively, from an external source. Initially the enabling input signal has a logic LO level, indicating that an output signal is not desired. This logic LO level at terminal 71 effectively grounds the cathode of the diode 69.

When the cathode of the diode 69 is grounded, the Zener diode 67 is reverse biased and a negative potential according to the Zener value of the diode 67 is developed at the anode of the diode 67 and applied to the bases of the transistors 65 and 79, turning the transistor 65 on and the transistor 79 off.

When the transistor 65 is turned on, its collector, and the base of the transistor 29 which is connected to said collector, are effectively connected to ground. This keeps the transistor 29 turned off and prevents any output signal from being provided by the transistor 29.

When the transistor 79 is turned off, no collector current flows through the resistor 83 and hence the collector of the transistor 79 remains at a positive potential near that of V+. This turns on the field effect transistor ("FET") 93, thereby effectively connecting the first terminal of the capacitor 105 to ground and diverting the first variable input signal from the negative input of the amplifier 27.

When the collector of the transistor 79 is at a positive potential as just described, the base of the transistor 81, which is connected to said collector, is brought to a potential which is positive with respect to the emitter of the transistor 81 and consequently the transistor 81 is turned off. When the transistor 81 is turned off, no base current can flow in the base circuit of the transistor 89 and it too is turned off. This in turn enables any bias signal potential developed at the output of the bias amplifier 51 to be applied to the first terminal of the capacitor 49 through the diode 63.

The amplifier 51 develops at its output a bias signal according to the magnitude of the first variable input signal and this bias signal is applied to the capacitor 49 to change the level of the charge on the capacitor 49.

When an output signal is desired, the enabling input signal assumes a logic HI level, thereby turning off the transistor 65 and turning on the transistor 79. When the transistor 65 is turned off, the base of the transistor 29 is no longer grounded and hence the transistor 29 is able to provide an output signal.

When the transistor 79 is turned on, its collector goes to a potential near grounded, turning off the FET 93 and turning on the transistor 81. When the FET 93 is turned off, it presents a very high impedance between its source and its drain, thereby ungrounding the first terminal of the capacitor 105 and enabling the negative input of the amplifier 27 to receive the first variable input signal. The capacitor 105 and the resistor 33 together serve to delay application of the first input signal to the amplifier 27 according to the characteristic response time of the amplifier 27 to improve stability and performance at times when the bias is not being applied to the capacitor 49.

More particularly, the capacitor 105 and the resistor 33 determine a time constant which governs the rate at which the amplifier 27 responds to any change in the first input signal. This time constant, and a time constant determined by the capacitor 49 and the resistor 37, are selected to optimize performance, as will be further explained in a succeeding paragraph.

The diodes 103 and 101 protect the amplifier 27 against any abnormally large values assumed by the first input signal.

When the transistor 81 turns on, the transistor 89 also turns on, reverse biasing the diode 63 and thereby blocking any bias signal developed by the amplifier 51 from reaching the capacitor 49.

As previously discussed, when the enabling input signal was at the LO level the transistor 29 was turned off, and since no current could flow in its collector circuit the collector assumed a negative potential equal to the potential provided by the load power supply. In the absence of the bias signal from the amplifier 51, the capacitor 49 would have charged to this potential. The presence of this charge on the capacitor 49 would have delayed the output signal after the enabling input signal went to the HI level until the capacitor 49 could discharge according to a time constant established by the values of the capacitor 49 and the resistor 37. It is this delay due to the discharge time of the capacitor 49 which is referred to as the "response time" of the control loop and which limits the rapidity with which the output signal can be provided when the enabling input signal goes HI.

The bias applied to the capacitor 49 by the amplifier 51 prevents the capacitor 49 from accummulating this charge during the time the enabling input signal is at the LO level and thus, when the enabling input signal goes HI, the transistor 29 is able to provided the output signal without any need to wait for the capacitor 49 to discharge. In this way any delay between the enabling input signal going HI and the providing of the output signal is minimized.

The delay in providing the output signal in response to the enabling input signal is particularly troublesome when only a small output signal is to be provided. This is because the current available to discharge the capacitor 49 is minimal under these circumstances. Thus, although an amplifier according to the invention provides an output signal of any magnitude in a minimum time, the benefits of biasing the capacitor 49 are most apparent in those situations where an output signal having a relationship small magnitude is desired.

Figure 3:
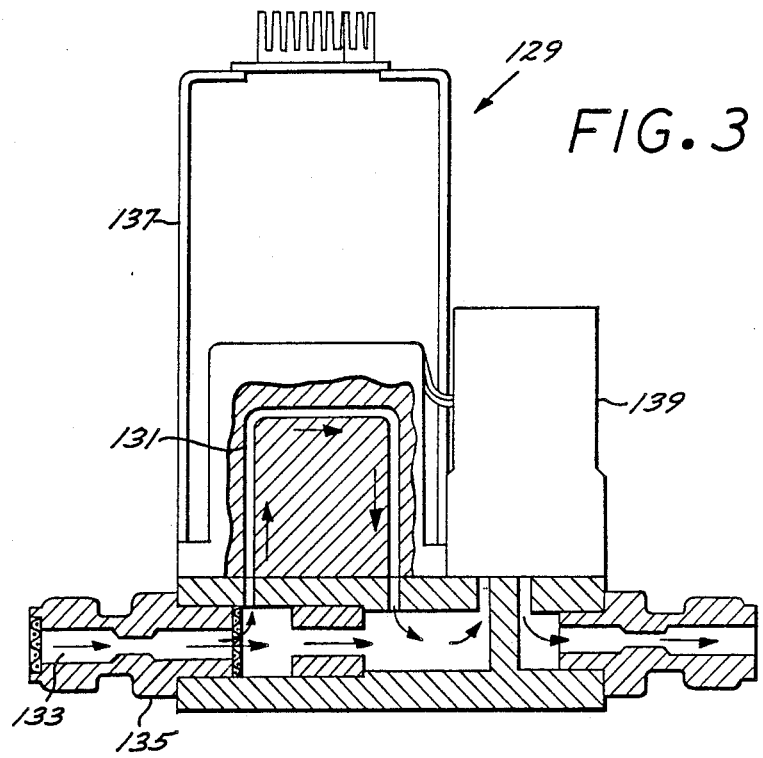
FIG. 3 is a partial section view of an improved fluid mass flow controller embodying the invention.

In a preferred embodiment, a fast response control circuit according to the invention is utilized to improve the response time of a fluid mass flow controller (designated generally as 129) as shown in FIG. 3. The controller 129 has a sensor tube 131 to measure the rate of mass flow of a fluid through a flow path 133 defined within a conduit 135. Means such as an electronic device 137 provides a mass flow signal indicative of the measured rate of mass flow of the fluid.

The controller 129 includes a circuit of the kind shown in FIG. 2. In particular, the controller 129 includes means such as the terminal 17A to receive a set point signal indicative of a desired rate of flow of the fluid, means such as the terminal 13 to receive an enabling input signal to start the flow of the fluid, amplifier means such as the amplifier 27 and the transistor 29 responsive to the enabling input signal to provide an output signal indicative of any difference between the mass flow and set point signals, and a feedback network such as the capacitor 49 and the resistor 47 in feedback relationship with the amplifier means and defining therewith a control loop characterized by a response time required for the output signal to attain a magnitude indicative of said difference.

Valve means such as a solenoid valve 139 is disposed in the fluid flow path 133 to regulate the rate of mass flow of the fluid. The valve 139 is connected as the load of the amplifier between the terminal 15 (see FIG. 2) and the negative terminal of the load power supply. The valve 139 responds to the output signal to change the rate of mass flow of the fluid and thereby to minimize any difference between the mass flow signal and the set point signal.

Bias means such as the bias amplifier 51 is provided and functions as described previously to change the charge level on the capacitor 49 during the time the fluid is not flowing and thereby to reduce the response time of the control loop.

When the fluid is flowing, any change in the rate of mass flow is detected in the sensor tube 131 and results in a change in the mass flow signal. The time constant determined by the capacitor 49 and the resistor 37 governs the time it takes the amplifier to respond to such changes in the mass flow signal. Similarly, the time constant determined by the capacitor 105 and the resistor 33 governs the time it takes the amplifier to respond to changes in the set point signal. These time constants are selected with reference to each other and with reference to physical parameters of the mass flow controller so as to provide a stable, smoothly responding system which regulates the rate of mass flow of the fluiid according to the desired rate as indicated by the set point signal.

From the foregoing it will be appreciated that a fast response control circuit according to the invention provides an output signal with minimum delay in response to an enabling input signal. Precise control of the time of commencement of a physical process which is regulated by the output signal can be achieved. A fluid mass flow controller according to the invention responds with minimum delay to an enabling input signal to cause the flow of a fluid to commence precisely upon command at any desired flow rate.

Although certain specific embodiments of the invention have been described and illustrated, the invention is not to be limited to the specific forms or arrangements of parts so described and illustrated, and various modifications and changes can be made without departing from the scope and spirit of the invention. Within the scope of the appended claims, therefore, the invention may be practiced otherwise than as specifically described and illustrated.

I claim:

1. A fast response control circuit comprising:
   amplifier means, responsive to an enabling input signal to provide an output signal having a magnitude determined by a variable input signal;
   a feedback network in feedback relationship with the amplifier means and defining therewith a control loop comprising a capacitor and resistor in series characterized by a response time; and
   bias means connected intermediate said capacitor and said resistor, operative to apply a bias signal to the control loop and thereby to reduce the response time.

2. A circuit according to claim 1 wherein the control loop includes a capacitor and wherein the bias signal is applied to change the level of charge on said capacitor.

3. A circuit according to claim 1 wherein the magnitude of the bias signal is determined by the variable input signal.

4. A circuit according to claim 1 wherein the magnitude of the bias signal is independent of the variable input signal.

5. A circuit according to claim 1 and further comprising interrupt means responsive to the enabling input signal to interrupt the communication between the bias means and the control loop.

6. A circuit according to claim 1 and further comprising delay means responsive to the enabling input signal to delay application of the variable input signal to the amplifier means.

7. A fast response control circuit comprising:
   differential amplifier means, responsive to an enabling input signal to provide an output signal having a magnitude determined by any difference between a first variable input signal and a second variable input signal;
   a feedback network in feedback relationship with the amplifier means and defining therewith a control loop comprising a capacitor and resistor in series characterized by a response time; and
   bias means connected intermediate said capacitor and said resistor, operative to apply a bias signal to the control loop and thereby to reduce the response time.

8. A circuit according to claim 7 wherein the control loop includes a capacitor and wherein the bias signal is applied to change the level of charge on said capacitor.

9. A circuit according to claim 7 wherein the magnitude of the bias signal is determined by one of the variable input signals.

10. A circuit according to claim 7 wherein the magnitude of the bias signal is independent of the variable input signals.

11. A circuit according to claim 7 and further comprising interrupt means responsive to the enabling input signal to interrupt the communication between the bias means and control loop.

12. A circuit according to claim 7 and further comprising delay means responsive to the enabling input signal to delay application of one of the variable iinput signals to the amplifier means.

13. In a fluid mass flow controller of the kind having means to provide a mass flow signal indicative of a measured rate of mass flow of a fluid, means to receive a set point signal indicative of a desired rate of mass flow of the fluid, means to receive an enabling input signal to start the flow of the fluid, amplifier means responsive to the enabling input signal to provide an output signal indicative of any difference between the mass flow and set point signals, a feedback network in feedback relationship with the amplifier means and defining therewith a control loop, comprising a capacitor and resistor in series, characterized by a response time required for the output signal to attain a magnitude indicative of said difference, and valve means responsive to the output signal to change the rate of mass flow to minimize said difference, an improvement comprising:
   bias means connected intermediate said capacitor and said resistor operative to apply a bias signal to the control loop and thereby to reduce response time.

14. An improvement according to claim 13 wherein the control loop includes a capacitor and wherein the bias signal is applied to change the level of charge on said capacitor.

15. An improvement according to claim 13 wherein the magnitude of the bias signal is determined by the set point signal.

16. An improvement according to claim 13 wherein the magnitude of the bias signal is independent of the set point signal.

17. An improvement according to claim 13 and further comprising interrupt means responsive to the enabling input signal to interrupt the communication between the bias means and the control loop.

18. An improvement according to claim 13 and further comprising delay means responsive to the enabling input signal to delay application of the set point signal to the amplifier means.

* * * * *

UNITED STATES PATENT AND TRADEMARK OFFICE
CERTIFICATE OF CORRECTION

PATENT NO. : 4,928,048
DATED : May 22, 1990
INVENTOR(S) : James H. Doyle

It is certified that error appears in the above-identified patent and that said Letters Patent is hereby corrected as shown below:

Column 2, line 40, delete "pre-changes" and insert --pre-charges--;

Column 4, line 64, after "FIG. 1A" insert --)--;

Column 5, line 29, delete "V-" and insert --V+--;

Column 6, line 16, delete "112" and insert --121--;

Column 7, line 10, delete "grounded" and insert --ground--; and

Column 8, line 3, delete "relationship" and insert --relatively--.

Signed and Sealed this

Tenth Day of September, 1991

*Attest:*

HARRY F. MANBECK, JR.

*Attesting Officer*  *Commissioner of Patents and Trademarks*